United States Patent [19]

Burka

[11] Patent Number: 5,111,562
[45] Date of Patent: May 12, 1992

[54] SPINDLE APPARATUS FOR HOLDING A WORKPIECE

[75] Inventor: Eric S. Burka, Lexington, Ky.

[73] Assignee: Versa Tech Engineering, Lexington, Ky.

[21] Appl. No.: 618,664

[22] Filed: Nov. 27, 1990

[51] Int. Cl.$^5$ .................... B23B 13/04; B23B 15/00
[52] U.S. Cl. .................... 29/37 R; 29/38 C; 82/129; 82/126; 51/216 ND; 51/229; 475/332
[58] Field of Search .............. 29/38 C, 38 B, 37 R, 29/38 R, 37 A; 384/517, 563; 82/129, 124, 153, 126, 147; 475/332, 317, 330; 408/71; 409/158, 173, 263, 900.2; 51/216 ND, 229; 74/665 GA

[56] References Cited

U.S. PATENT DOCUMENTS

| | | | |
|---|---|---|---|
| 1,564,353 | 4/1922 | Johnson | 29/38 C |
| 1,664,740 | 4/1928 | Doane | 29/38 B |
| 1,996,368 | 4/1935 | Drissner | 29/37 R |
| 2,701,505 | 2/1955 | Fink | 409/173 |
| 2,920,376 | 1/1960 | Lakins et al. | 82/127 |
| 3,307,890 | 3/1967 | Johansson | 384/517 |
| 3,620,586 | 11/1971 | Maastricht | 384/563 X |
| 3,693,485 | 9/1972 | Maurer | 82/129 X |
| 3,735,460 | 5/1973 | Crachy et al. | 29/48.5 |
| 3,744,354 | 7/1973 | Gilbert | 82/129 |
| 3,864,994 | 2/1975 | White | 82/129 |
| 3,974,553 | 8/1976 | Reiger, Jr. et al. | 29/38 C |
| 4,048,880 | 9/1977 | Link | 82/129 |
| 4,106,376 | 8/1978 | Freer | 82/147 |
| 4,217,800 | 8/1980 | Furegati | 82/127 |
| 4,221,141 | 9/1980 | Oliver | 82/127 |
| 4,779,318 | 10/1988 | Henderson | 82/129 X |

Primary Examiner—Larry I. Schwartz
Assistant Examiner—J. R. Daulton
Attorney, Agent, or Firm—King & Schickli

[57] ABSTRACT

A spindle apparatus for holding a workpiece for machining includes a stationary support structure and preferably multiple rotary spindle members for holding individual workpieces. Each rotary spindle member is mounted in a spindle carriage that is rotatably mounted to the stationary support structure. As the spindle carriage is rotated on the support structure, the spindle members move in an orbital path. A rotary indexing apparatus is provided for rotatably driving the spindle members and the spindle carriage. The indexing apparatus is connected to a transmission including a fixed center gear as well as planetary gears and spindle member drive gears for each spindle member. A piston assembly received in each spindle member engages and holds a distal end of the workpiece and allows for the axial advancing of any selected incremental length of the workpiece through the rotary spindle member for machining. A controller operatively controls the rotary indexing apparatus and the movement of the piston assembly in each spindle member. Additionally, a system is provided for preloading bearings that support the spindle carriage on the support structure to allow more precise and reproduceable machining of the workpieces.

23 Claims, 5 Drawing Sheets

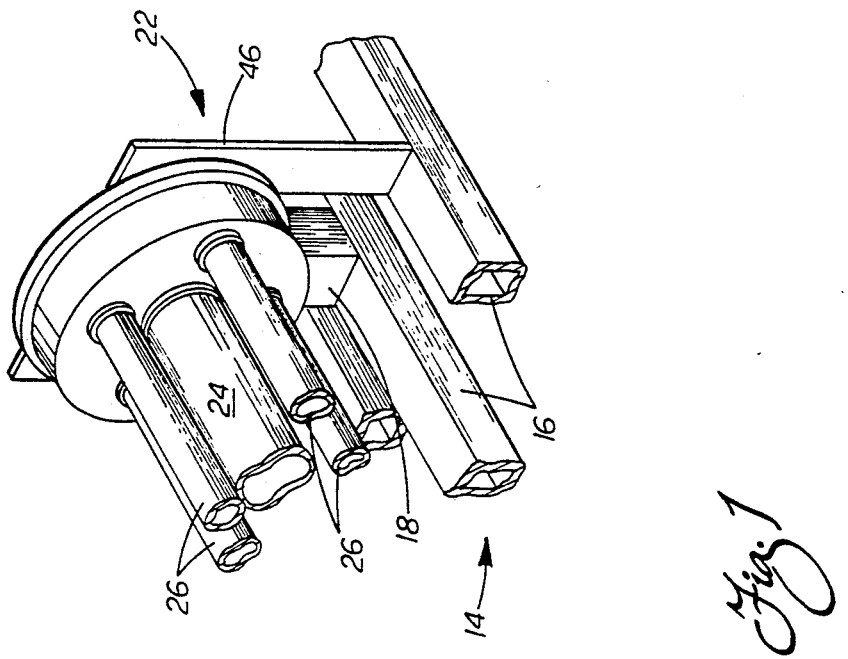
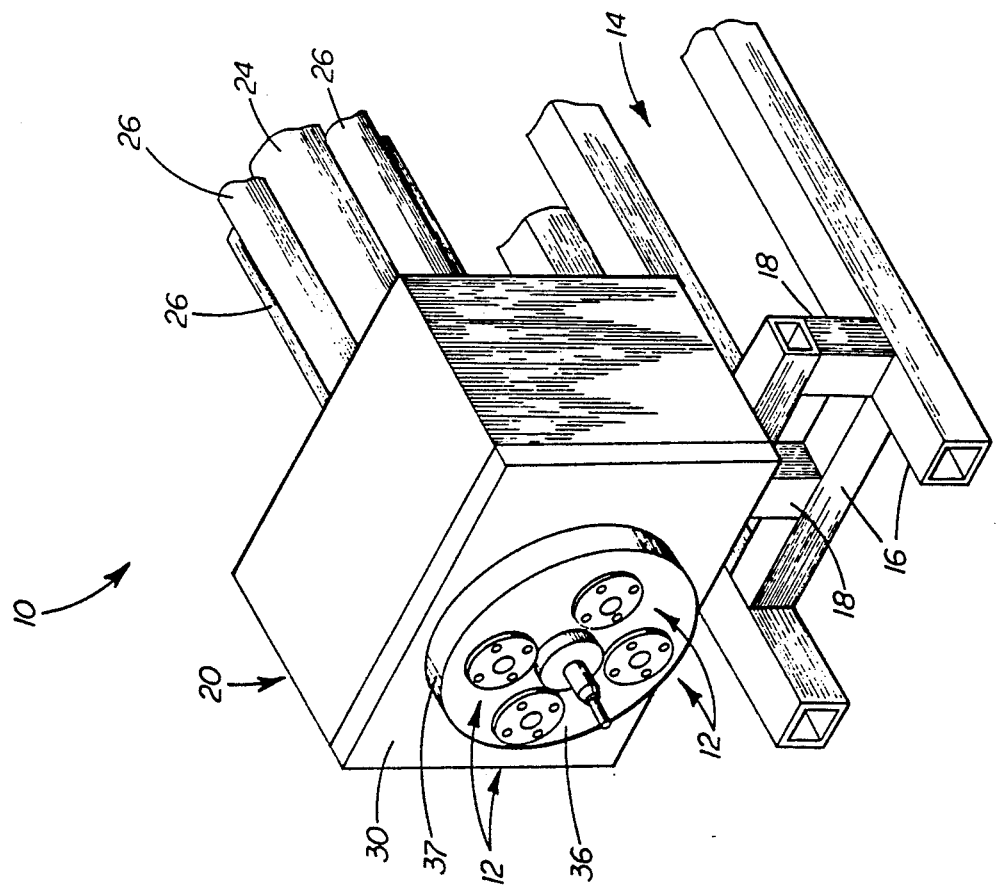

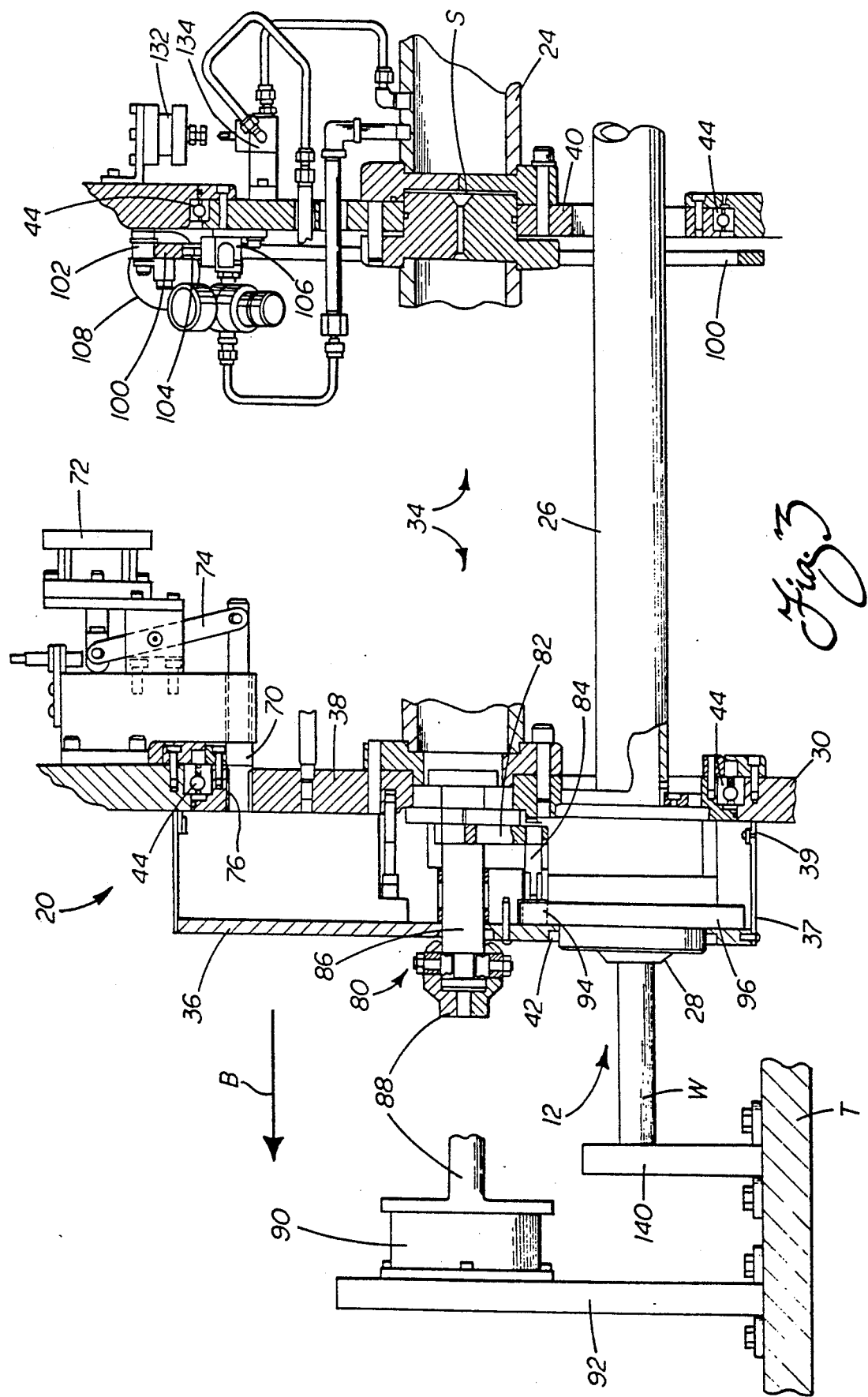

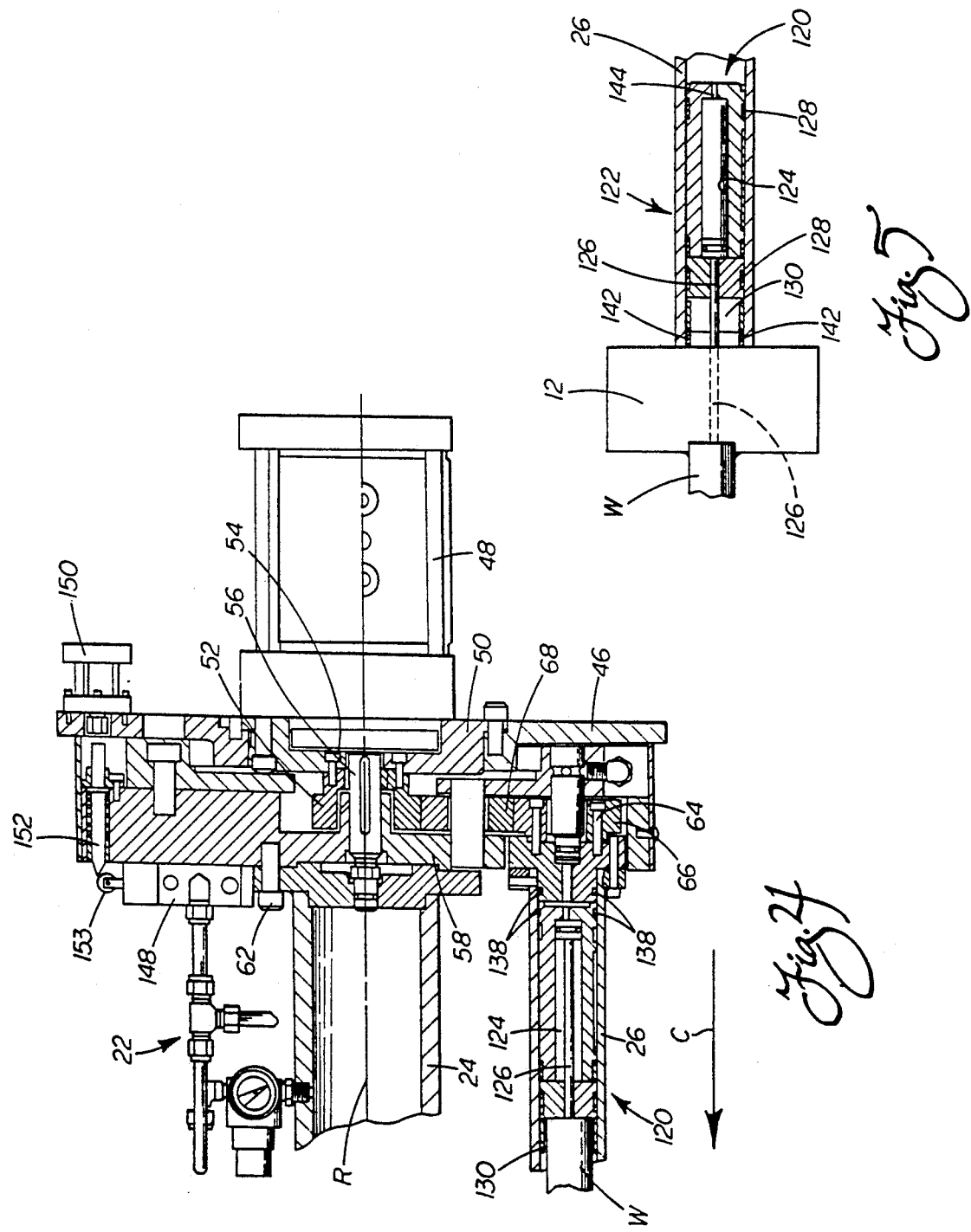

SPINDLE APPARATUS FOR HOLDING A WORKPIECE

TECHNICAL FIELD

The present invention relates generally to the machine tool art and, more particularly to an apparatus including multiple rotary spindles adapted for holding a workpiece, an indexable spindle carrier, and a piston assembly in each spindle for advancing the workpiece a selected axial length.

BACKGROUND OF THE INVENTION

Multiple spindle bar or chucking machines have long been known in the art. Representative designs of multiple spindle machines are found in U.S. Pat. Nos. 1,664,742 to Doan, 4,048,082 to Link, and 3,735,460 to Crachy et al.

As disclosed in the Doan patent, multiple spindle machines typically include a rotatable turret that carries a plurality of spindles for holding workpieces. Each spindle includes a chuck operated by compressed air that may be actuated to securely engage a workpiece and hold it in position for machining. The rotatable indexing turret is locked in position by means of a locking bolt or pin that is biased by a spring so as to engage a notch in the turret. The individual spindles may also be prevented from rotating by engagement of projections or pins in cooperating notches of a plate keyed to the spindle.

Despite the existence of a large number of multiple spindle machine designs in the art, further improvements in construction and many operating characteristics are still desired.

SUMMARY OF THE INVENTION

Accordingly, it is a primary object of the present invention to provide an improved spindle apparatus for holding a workpiece overcoming many of the limitations and disadvantages of the prior art.

An additional object of the present invention is to provide a spindle apparatus for holding a workpiece including a rotary spindle and indexable spindle carrier that may be rapidly rotated between several working positions. Both the rotary spindle and spindle carrier may be automatically locked and centered in position upon completion of angular indexing movement to a selected working position.

Yet another object of the present invention is to provide a multiple spindle apparatus that is relatively inexpensive to produce and maintain while providing smooth, efficient and precise operation.

Still another object of the present invention is to provide a multiple spindle apparatus capable of precisely advancing a selected incremental length of a workpiece through each of the spindles for machining operations.

A further object of the present invention is to provide a multiple spindle apparatus with a rotatable spindle carrier held in bearings that may be preloaded prior to machining to reduce play and thereby ensure more accurately machined/finished products.

Additional objects, advantages, and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the forgoing and other objects, and in accordance with the purposes of the present invention as described herein, an improved spindle apparatus is provided for holding a workpiece during machining operations. The apparatus includes one or more rotary spindle members. Each spindle member is adapted for holding a workpiece such as bar stock that is to be machined. Each of the rotary spindle members is held in a spindle carrier rotatably received in a support frame. Rotation of the spindle carrier results in orbital movement of the rotary spindle members.

The apparatus also includes a mechanism for rotatably driving both the spindle members and the spindle carrier. Additionally, the apparatus includes a mechanism for advancing a selected incremental length of a workpiece through the rotary spindle member for machining. Finally, a microprocessor controller is provided for operatively controlling the drive mechanism and the advancing mechanism.

Each of the rotary spindle members includes a pneumatic chuck, of a type known in the art, for gripping and holding the workpiece during machining operations. Each chuck is mounted for relative rotation with the spindle member between a face plate and turret plate of the headstock assembly of the spindle carriage.

The apparatus also includes an actuator controlled shot pin. The shot pin is displaceable to secure the spindle carriage in an indexed position prior to performing machining operations on the workpiece. More particularly, the shot pin is selectively displaceable between a first position wherein the shot pin is received in a tapered aperture in the turret plate of the headstock assembly and a second position wherein the shot pin is withdrawn from the aperture in the turret plate so as to allow free rotation of the spindle carriage in the support frame.

Additionally, the apparatus includes an actuator controlled locking pin adapted for locking the rotary spindle member in a selected, indexed position. More particularly, the locking pin is selectively displaceable between a first position wherein the locking pin is received in a locating aperture in the rotary spindle member so as to lock the spindle member in position and a second position wherein the locking pin is withdrawn from the aperture so as to allow free rotation of the rotary spindle member in the spindle carriage.

The drive mechanism preferably includes a rotary indexer of the type disclosed and described in copending U.S. patent application Ser. No. 617,619, entitled "Rotary Indexing Apparatus" and filed Nov. 26, 1990. The disclosure set forth in this application is hereby incorporated herein by reference. The rotary indexing apparatus is connected to a transmission including a stationary gear, a planetary gear orbiting about the stationary gear and a rotary spindle drive gear connected to the rotary spindle member and engaging the planetary gear. The stationary gear, planetary gear and rotary spindle drive gear are all of the same ratio so that the relative orientation of the workpiece is maintained in each workstation position as the rotary spindle member moves along an orbital path in the spindle carriage.

The mechanism for advancing an incremental length of the workpiece through the rotary spindle member comprises a piston assembly received in sliding engagement in the rotary spindle member. More particularly, the piston assembly includes a piston head having a cavity. A captive pin is received in sliding engagement in the cavity. A port is provided in the piston head for feeding pressurized fluid to the captive pin. Additionally, the piston head includes a socket for engaging a distal end of the workpiece so as to support it in position in alignment with the pneumatic chuck so as to allow proper feeding and clamping operations.

In accordance with the invention, a selected incremental length of the workpiece may be advanced through the chuck of the rotary spindle member by first releasing the grip of the chuck on the workpiece. Fluid pressure is fed into the rear end of the rotary spindle member behind the piston assembly. This fluid pressure serves to advance the piston assembly toward the chuck thereby pushing the workpiece through the chuck. A stop member is mounted on the work table a selected distance from the chuck at the workstation position. When the end of the workpiece engages and abuts the stock member, a selected length of the workpiece has been advanced through the chuck. The chuck is then actuated to tighten the chuck around the workpiece and securely hold the workpiece in position. The workpiece is then ready for indexing to the next work station where, for example, machining operations may be performed.

After all the machining operations have been completed, a cutting means such as a circular saw may be utilized to cut the workpiece to a desired length. Where the workpiece needs to be further advanced through the chuck to cut a final product of desired length, the procedure described above may again be utilized.

In accordance with yet another aspect of the present invention, the apparatus is equipped with a bearing arrangement that may be preloaded with pressurized fluid to limit play in the bearing prior to completing any machining operations. This advantageously serves to improve the accuracy and reproduceability of the machining operations to a level previously not obtainable in multiple spindle machines of the prior art not incorporating relatively expensive anti-friction bearing arrangements. Pressurized fluid directed to load the bearings is released after the completion of machining operations and prior to indexing of the spindle carriage to the next work position. In this way, rotation of the spindle carriage is made possible with the exertion of a minimal amount of force so as to allow fast, smooth and efficient indexing.

Operation of the entire apparatus may be controlled by a microprocessor controller. The microprocessor controller operates a valve bank to direct pressurized fluid from a pressurized fluid source to the various actuators, such as pneumatic cylinders, that operate the rotary spindle member locking pin, the spindle carriage shot pin, the movement of the piston assembly that advances the workpiece and the bearing preload system.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principals of the invention. In the drawing:

FIG. 1 is a perspective view of the spindle apparatus of the present invention;

FIG. 3 is a cross-sectional view of the headstock assembly taken along the line III—III in FIG. 2;

FIG. 4 is a cross-sectional view of the tailstock assembly taken along a section line corresponding to section line III—III shown in FIG. 2;

FIG. 5 is a detailed schematical cross-sectional view showing the operation of the piston assembly in advancing the workpiece through the rotary spindle member as the piston assembly abuts the stop at the end of the rotary spindle member adjacent the chuck.

Figure 2:
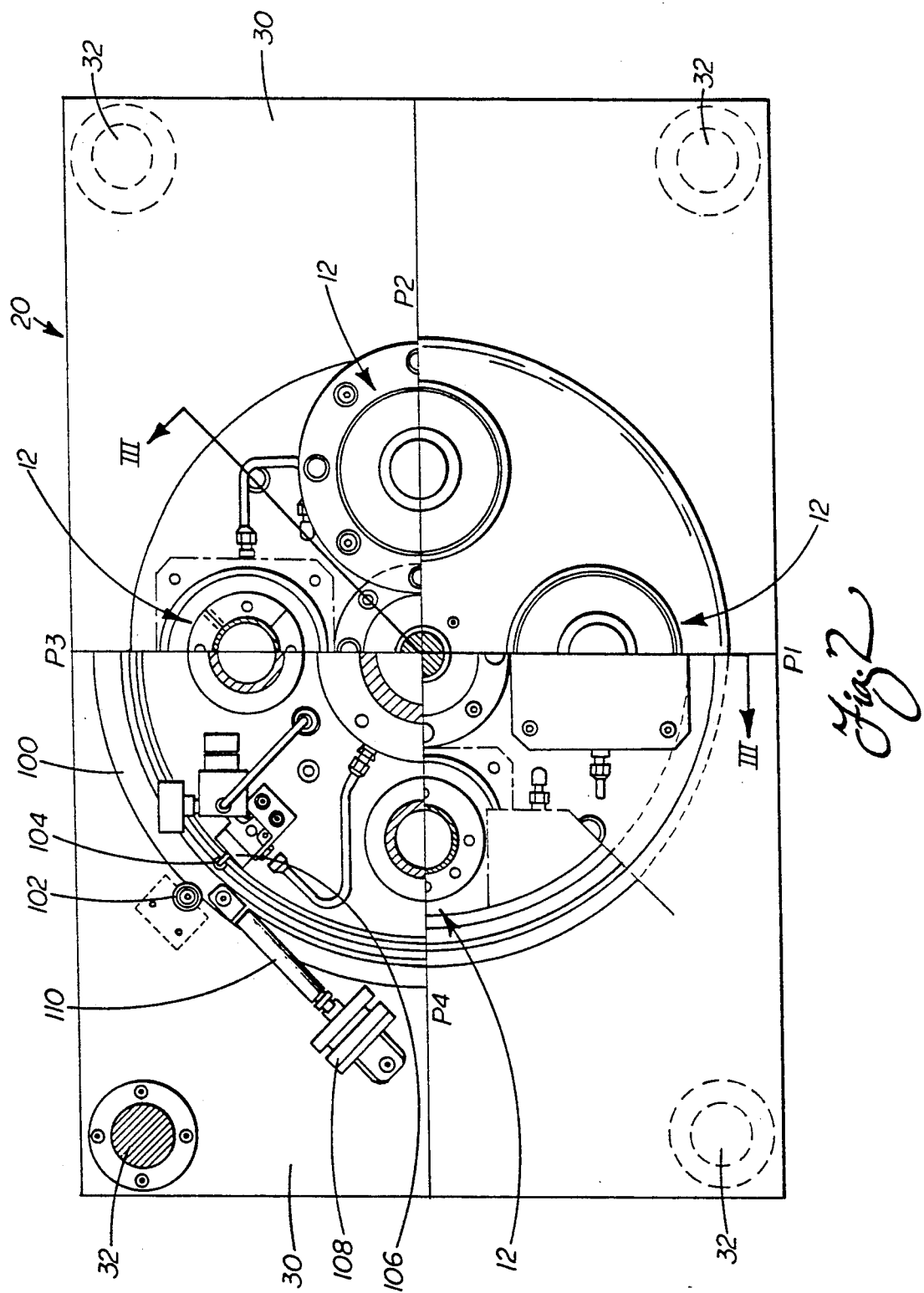
FIG. 2 is a cut-away front end view of the headstock assembly.

Reference will now be made in detail to the present preferred embodiment of the invention, an example of which is illustrated in the accompanying drawing.

DETAILED DESCRIPTION OF THE INVENTION

Reference is now made to the drawing figures and particularly FIG. 1 showing the improved spindle apparatus 10 of the present invention for holding a workpiece. The embodiment being described includes four separate rotary spindle members 12 aligned and radially arranged to be diametrically opposed along perpendicular axes. Each of the rotary spindle members 12 may be sequentially indexed in a counterclockwise direction as viewed from FIG. 2 through 90° to four separate work stations P1–P4. It should be recognized, however, that the present preferred embodiment is merely an example of just one embodiment of the present apparatus and that the apparatus may include a different number of rotary spindle members 12 as well as a different number of work stations as necessary depending upon the particular purpose to which the apparatus 10 is being applied. The apparatus may also be utilized to index the spindles in a clockwise direction if desired. Accordingly, it should be clear that the following embodiment is being described for illustrative purposes and that the invention and claims should not be limited thereto.

As shown in FIG. 1, the apparatus 10 is mounted on a support frame 14 including a base member 16 and a series of vertically extending legs 18. A headstock assembly 20 is mounted at one end of the support frame and a tailstock assembly 22 is mounted at the opposite end. The headstock and tailstock assemblies 20, 22 respectively, will be described in greater detail below.

As shown, a centrally located pressurized fluid manifold 24 extends between the headstock assembly 20 and tailstock assembly 22. Four spindle tubes 26 also extend between the headstock assembly 20 and tailstock assembly 22. The spindle tubes 26 are concentrically disposed in a radial array about the central manifold 24 and are diametrically opposed on perpendicular axes. Each rotary spindle member 12 comprises a pneumatic chuck 28 for gripping or holding a workpiece W and an aligned spindle tube 26 in which the workpiece is held during operation of the apparatus 10.

As best shown in FIGS. 2 and 3, the headstock assembly 20 comprises a pair of spaced parallel mounting plates 30 that are held together and fixed to the support frame 14 by four fasteners 32. One fastener 32 is provided at each corner of the parallel mounting plates 30. A spindle carriage 34 is rotatably mounted in the parallel mounting plates 30. The spindle carriage 34 includes a face plate 36, a turret plate 38, a guard 37 and seal 39 mounted to the face plate and an end plate 40. Each of the rotary spindle chucks 28 is captively held between the face plate 36 and turret plate 38 in the manner shown in FIG. 3. Further, it should be appreciated that each of the chucks 28 is held for relative rotational movement in the face plate 36 by means of the bearings 42. Additionally, the turret plate 38 and end plate 40 are held for relative rotation in the mounting plates 30 by means of the heavy duty bearings 44.

The tailstock assembly 22, shown best in FIG. 4, includes a stationary mounting plate 46 fixed to the support frame 14. A rotary indexing apparatus 48 is mounted on the mounting plate 46 by means of a mounting adapter 50. A fixed gear 52 is mounted to the adapter 50 by means of the bolts 54. The fixed gear 52 is concentrically disposed around the drive shaft 56 of the indexing apparatus 48. The gear 52 is also keyed to the drive hub 58 of the spindle carriage 34 which is mounted for relative rotation on the stationary mounting plate 46 by means of the bearings 60.

As shown, the trailing end of the central pressurized fluid manifold 24 is fixed to the rotary hub member 58 by means of bolts 62. The trailing end of each of the spindle tubes 26 is fixed by means of bolts 64 to a rotary spindle drive gear 66 that engages a planetary gear 68 which in turn engages and revolves around the fixed gear 52 as the spindle carriage 34 is rotated by the rotary indexing apparatus 48.

In the embodiment shown, the fixed gear 52, planetary gear 68 and rotary spindle drive gear 66 have the same pitch diameter. As a result, the workpiece W is held in the same relative position as the spindle carriage 34 indexes to each of the four workstation positions P 1-4 shown in FIGS. 1 and 2.

After indexing is completed, it is necessary to lock the spindle carriage 34 and the individual rotary spindle members 12 in position prior to completing any machining operations on the workpieces W. The locking serves to reduce system play thereby improving the accuracy of the machining operations to finer tolerances.

More specifically, the spindle carriage 34 is locked into position by means of the shot pin 70 (note FIG. 3). As shown, the shot pin 70 is connected to a fluid operated actuator 72 by means of the lever arm 74. As shown in FIG. 3, the shot pin 70 is retracted from a locating aperture 76 provided in the turret plate 38. As should be appreciated, the locating aperture is tapered so as to be self centering with the pin 70 when it is extended into the aperture to lock the turret plate 38 and, therefore, the spindle carriage 34 in an indexed position. Of course, it should be appreciated that there are a series of four locating apertures 76 provided in the turret plate with each aperture located at 90° along a circular arc from the adjacent apertures. This arrangement allows the spindle carriage 34 to be locked with each spindle member 12 in any of the four separate work station positions P 1-4.

The apparatus 10 also includes a locking pin mechanism generally designated by reference numeral 80 for engaging and fixing the rotary spindle numbers 12 in an indexed position. More particularly, the locking pin mechanism comprises a spider member 82 including four diametrically and perpendicularly, opposed parallel locking pins 84 (only one shown in FIG. 3). The spider member 82 is mounted on a shaft 86 to which is attached the rod 88 of a pressurized fluid operated actuator 90.

As shown in FIG. 3, the actuator 90 is mounted to the plate 92 extending vertically upwardly from the tooling table T. When the rod 88 of the actuator 90 is extended, the spider member 82 is in the full line position shown in FIG. 3 with all the pins 84 withdrawn from engagement in the locating apertures 94 formed in the guide flanges 96 of the spindle members 12 (only one shown in the figure). This is the position of the spider member 82 and locking pins 84 during indexing movement of the apparatus 10. Once the apparatus 10 advances the rotary spindle members 12 into the next indexed position, fluid pressure is directed to the actuator 90 so as to retract the rod 88 thereby drawing the spider member 82 and locking pins 84 in the direction of action arrow B in FIG. 3 until the pins 84 are fully engaged in the locating apertures 94. This serves to lock all the rotary spindle members 12 in position so that the machining of the workpieces W held therein may be initiated.

In accordance with a further aspect of the present invention, the apparatus 10 of the present invention includes a system for preloading the bearings 44 so as to insure that the workpieces W are more rigidly held in position during machining operations. Accordingly, more accurate and reproducible machining may be completed as a result of this design.

More particularly, the apparatus includes a floating annular cam member 100. As best shown in FIGS. 2 and 3, the cam member 100 is mounted between a series of rollers 102 fixed to one of the parallel mounting plates 30. A roller actuator 104 of a valve 106 mounted for rotation with the end plate 40 engages and rides upon the inner cam surface of the member 100. A system actuator 108 is mounted to the mounting member 30. The extensible and retractable rod 110 of the actuator 108 is fixed to the floating annular cam 100. During indexing, the roller 104 rolls along the cam 100 with the valve 106 remaining in the normally closed position, blocking the feed port from the central manifold 24 and venting the hub space S to atmosphere. Just as the spindle carriage 34 approaches the end of the 90° indexing cycle, the roller actuator 104 following the cam 100 is forced to actuate the valve 106. This closes the hub space S to atmosphere and opens it for communications with the central manifold 24. Accordingly, pressurized fluid fills the hub space S, loading the bearings 44 prior to machining.

After machining is completed, actuator 108 is activated and rod 110 is extended to move the annular cam 100 in a clockwise direction relative to the roller 104 of valve 106. As this is done the roller 104 follows the cam surface 100. As a result, the valve 106 is returned to its original position and pressurized fluid is released from the space S thereby unloading the bearings 44 for free and efficient indexing movement. The spindle carriage 34 is then ready for indexing with the indexing apparatus 48. During indexing movement, the actuator 108 is recycled to its original position and the bearings 44 are again loaded as the apparatus approaches the next indexed position. Following machining, the operation described above is repeated to unload the bearings prior to the next indexing cycle.

The workpiece W in each spindle member 12 may also be independently advanced any selected incremental length by operation of a piston assembly 120. One such piston assembly 120 is mounted in each spindle member 12, however, only one is shown in FIGS. 4 and 5. Each piston assembly 120 includes a two-piece piston head 122 having a cavity 124 that receives a captive pin 126. The piston head 122 slides on bearings 128 through the length of the spindle tube 126. Similarly, captive pin 126 slides through the entire length of the cavity 124.

A socket 130 in the front of the piston head 122 is adapted to receive and hold the distal end of the workpiece W. Accordingly, the workpiece W is maintained in proper alignment in the spindle member 12 so as to allow the workpiece to be properly gripped by the chuck 28.

When it is desired to advance the workpiece W through the chuck 28 of the spindle member 12, the actuator 132 is activated to engage the valve 134 and release fluid pressure on the chuck 28. Accordingly, gripping pressure is released and the workpiece W is free to be moved through the chuck 28. Positive fluid pressure from the central manifold 24 is directed through the port 137 and maintained in the spindle tube 26 behind the piston head 122 by the O-ring seals 138. This fluid pressure drives the piston assembly 120 in the direction of action arrow C in FIG. 4 until the distal end of the workpiece W engages a stop 140 (also see FIG. 3). The stop 140 is set (either manually or mechanically) above the tooling table T in position to ensure that the desired length of workpiece W is extended through the chuck 28. Once the workpiece W butts against the stop 140, the actuator 132 is again activated to restore positive fluid pressure flow to the chuck 28 which in turn regrips the workpiece in the newly extended position.

Machining operations may now be carried out on the workpiece W at this same workstation P or the apparatus 10 may be operated to index the workpiece to the next station. Of course, it should also be appreciated that the piston assembly 120 and a similar stop 140 may be utilized in a similar manner to advance a selected length of workpiece through the chuck 28 to be cut off by a circular saw (not shown) or other appropriate cutting equipment once machining is completed.

As the distal end of the workpiece W approaches the end of the spindle tube 26 adjacent the chuck 28, the front face of the piston head 122 engages a stop 142 (see FIG. 5). At this point, the positive fluid pressure behind the piston assembly acts through the port 144 in the rear wall of the piston head 122 to force the pin 126 forward in the cavity 124 until the pin reaches the position shown in FIG. 5. As a result, the forward end of the pin 126 pushes the workpiece W from the socket 130 and the chuck 28. Accordingly, the workpiece is ejected from the apparatus 10.

It must be recognized due to the relative surface areas of the captive pin 126 and piston head 122 upon which the positive fluid pressure bears, the pin 126 is only extended in the manner shown in FIG. 5 when the piston head bears against the stop 142. At all other times, the pin 126 remains retracted inside the piston head 122 as shown in FIG. 4. Hence, the workpiece W always remains firmly seated in the socket 130 until the time of ejection of the workpiece from the spindle member 12.

When it becomes necessary to place a new length of workpiece W in the spindle member 12, the chuck 28 is fully opened. Additionally, the actuator 150 is activated to extend the pin 152. The pin 152 engages the roller actuator 153 of the valve 148 thereby releasing fluid pressure in the spindle tube 26 behind the piston assembly 120 to atmosphere. The workpiece W is then manually inserted into the spindle tube 26. This is done by placing the distal end of the workpiece W in the socket 130 and pushing the piston assembly 120 backward in the spindle tube 26 to the position shown in FIG. 4. Operation of the apparatus 10 is then reinitiated as described below with the reference to drawing FIG. 6.

Figure 6:
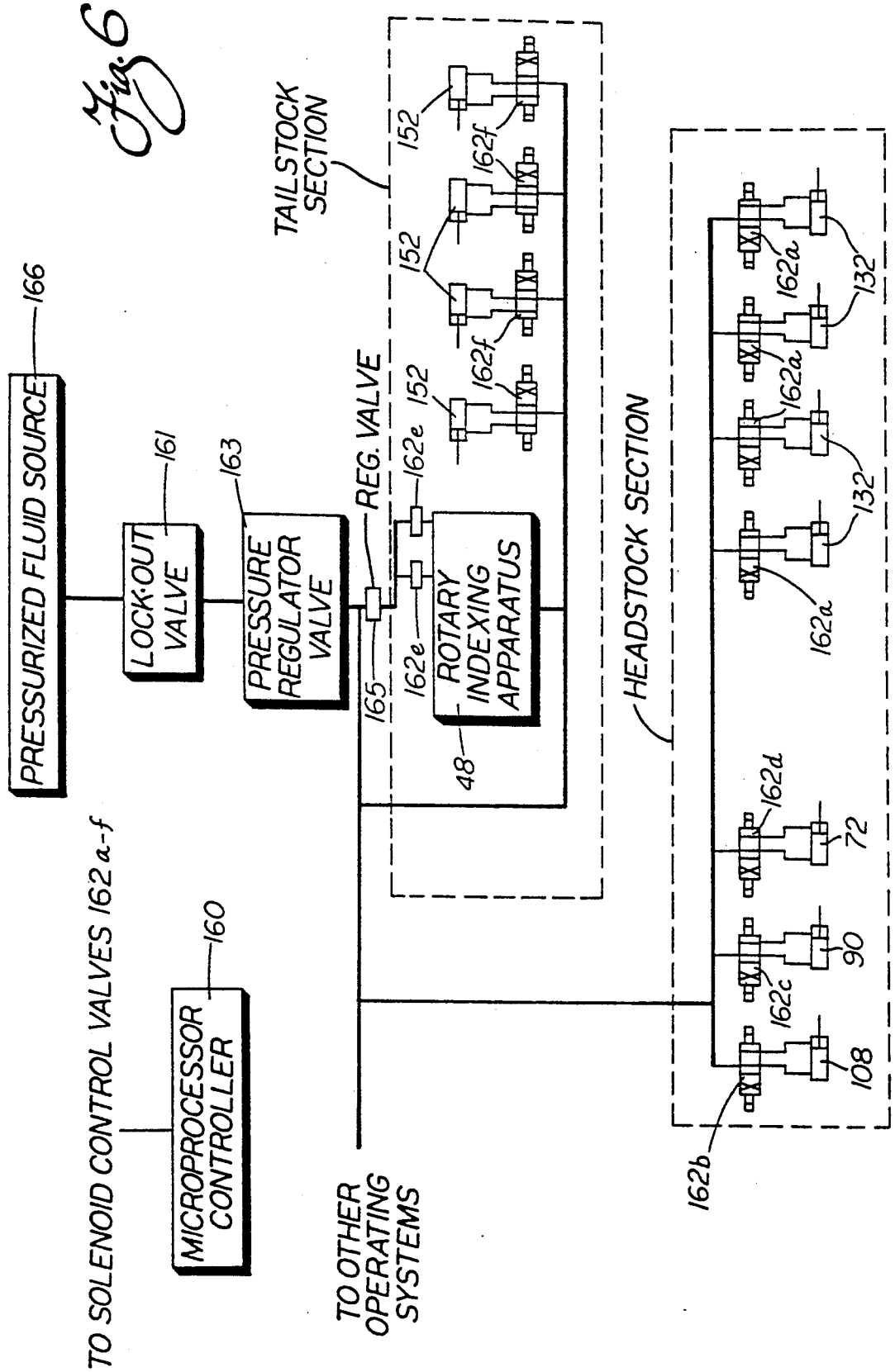
FIG. 6 is a schematic circuit diagram showing the operational control system of the present apparatus.

Drawing FIG. 6 schematically shows the control circuit 158 for the apparatus 10 of the present invention. As should be appreciated from viewing the figure, the apparatus 10 is fully automated with operation control being provided by a microprocessor controller 160. The controller 160 is operatively connected to a series of solenoid valves 162 a-f through control lines 164. These valves 162 a-f control the flow of pressurized fluid from the source 166 to the various system actuators 72, 90, 108, 120, 132, 150 that provide operation of the apparatus 10. A safety lock-out valve 161 and pressure regulator valve 163 (set at, for example 80 psi) are provided in the feed line between the pressurized fluid source 166 and the manifold 24.

Operation of the apparatus 10 is initiated by manually placing a workpiece W in each of the rotary spindle members 12 in the manner described above. Next, the microprocessor controller 160 is directed through entry of an appropriate command by means of an operator keyboard (not shown) or other known operator interface to initiate automatic operation. Fluid pressure is fed through a port in the drive shaft 56 of the rotary indexing apparatus 48 from a pressurized fluid source 166 into the central manifold 24. The manifold 24 is concentrically disposed about the axis of the rotation R of the spindle carriage 34 with which it rotates during indexing. At start up, the various actuators 72, 90, 132 and 150 controlling operation of the shot pin 70, locking pins 84, piston assembly advance mechanism and chuck release mechanism are all maintained so as to allow the application of positive pressure from the central manifold 24. Hence, the chucks 28 are closed gripping the ends of the workpieces W, the shot pin 70 is received in the turret plate 38 locking the spindle carriage 34 in position, the locking pins 84 are received in the locking apertures 94 of the chucks 28 locking them in position and the valves 148 are set so as to provide for application of positive fluid pressure behind the piston assemblies 120.

Next the microprocessor controller 160 activates the solenoid valve 162a to the chuck release actuator 132 of chuck 28 at workstation P1 (see also FIGS. 1 and 3). Accordingly, the chuck release actuator 132 engages the flow control valve 134 that now blocks the flow of positive pressure from the manifold 24 to the pneumatic chuck 28. Simultaneously, pressure on the chuck side of the valve 134 is released to atmosphere. As a result, the chuck 28 releases the workpiece W. Consequently, the workpiece W is pushed through the chuck to the stop 140 by the positive fluid pressure exerted behind and driving the piston assembly 120. As indicated above, the stop 140 is mounted a set distance from the front of the chuck 28 to allow a selected incremental length of workpiece to be advanced for machining.

After a preset time delay or in response to a signal from a transducer sensing contact between the workpiece W and the stop 140, the controller 160 sends a signal to the solenoid valve 162a returning the valve and the chuck release actuator 132 it controls to their original positions. This reestablishes application of pressurized fluid from the manifold 24 to the chuck 28. Accordingly, the chuck 28 again tightly grips the workpiece W. The same steps are followed to advance the workpieces W as each rotary spindle member 12 moves into workstation P1.

Next, the spindle carriage 34 is indexed through 90° to bring the first spindle to workstation P2. Just prior to indexing, the controller 160 activates the solenoid valves 162b, 162c and 162d in the feed lines to the preload cam actuator 108, the locking pin actuator 90 and the shot pin actuator 72, respectively. As a result, the actuators 90 and 72 operate to withdraw the locking pins 84 from the locating apertures 94 in the rotary spindle members 12 and the shot pin 70 from the indexing aperture 76 in the turret 38 respectively. Additionally, the rod 110 of the actuator 108 is extended and the annular cam 100 is accordingly rotated slightly relative to the spindle carriage 34. As the roller 104 follows the surface of the cam 100, the valve 106 is activated to block pressurized fluid flow from the manifold 24 to the hub space S and to vent the space S to atmosphere thereby relieving fluid pressure. Accordingly, the spindle carriage 34 rotates more freely through 90° to the next indexed position to provide more efficient operation with minimal effort.

Indexing is now completed by the rotary indexing apparatus 48 that has a pressure regulator valve 165 and solenoid valves 162e that receive control signals from the master controller 160. A more complete description of the rotary indexing apparatus 48 and its operation is presented in copending U.S. patent application Ser. No. 07/723843 entitled Rotary Indexing Apparatus, the complete disclosure of which is incorporated herein by reference.

As the spindle carriage 34 is rotated, the fixed gear 58, planetary gears 68 and rotary spindle drive gear 66 function in the manner described above to maintain the workpieces W in the same relative orientation in each workstation P1-P4 (see FIG. 1).

During the initial phases of indexing movement, the controller 160 sends a signal to the solenoid valve 162b causing that valve and the associated actuator 108 to return to their original positions. Toward the end of the 90° indexing cycle, the cam 100 forces the roller actuator 104 to activate the valve 106. This closes the hub space S to atmosphere and opens it for communication with the central manifold 24. Accordingly, fluid pressure fills the hub space S loading the bearings 44. As the bearings 44 load, friction is increased and a braking effect is produced which slows the spindle carriage 34 as it approaches the fully indexed position. Accordingly, smooth operation is assured.

Once indexing movement is completed, the controller 160 sends a signal to the solenoid valves 162c and 162d returning these valves and the actuators 90, 72 that they control to their original positions. As a result, the locking pins 84 are again extended into the locating apertures 94 in the rotary spindle members 12 to lock them into the new indexed position. Similarly, the shot pin 70 is extended into the indexing aperture 76 in the turret plate 38. Thus, the rotary spindle members 12 and spindle carriage 34 are again firmly locked in position and all relative movement is prevented. Of course, it should be appreciated that the locating apertures 94 and the indexing aperture 76 now receiving the pins 84, 70, respectively, are 90° removed from the previous apertures receiving these pins.

With the spindle members 12 and spindle carriage 34 locked in position and the hub space S filled with the pressurized fluid to load the bearings 44, machining operations may be initiated and completed on the workpiece W held in the spindle member 12 at workstation P2. Of course, similar or identical machining operations may be completed as each rotary spindle member moves a new workpiece into workstation P2.

Once machining operations are completed, the master controller 160 operates in the manner described above to again index the spindle carriage 34 so as to bring the first rotary spindle member 12 to the next work station P3. Here, further machining operations may be completed. Alternatively, or in addition to further machining operations, the workpiece W may be further extended from the chuck 28 if desired. This is also done in the manner described through cooperation between the piston assembly 120, chuck 28 and a stop 140.

When all machining/processing steps are completed, the controller 160 again operates in the manner previously described to advance the first rotary spindle member 12 to the last workstation P4. Here a rotary saw (not shown) may, for example, be activated to cut the workpiece W to a desired length. The operation of the saw may also be controlled by the controller 160. Following this operation, the spindle carriage 34 is indexed again in the manner described to return the first spindle member 12 to workstation 1 whereupon the processing cycle is repeated. Since each spindle member 12 may, for example, hold a workpiece W up to 12 foot in length, many operating cycles may be completed before the rotary spindle members 12 must be reloaded in the manner previously described.

When reloading is required, the microprocessor controller 160 activates the valve 162f associated with each spindle member 12 to be reloaded. This serves to extend the actuator 150 which in turn acts to operate the valve 148 through the pin 152 and actuator roller 153. Fluid pressure is then released from the spindle tube 26 behind the piston assembly 120. Substantially simultaneously, the microprocessor controller 160 activates the valve 162a to release the associated chuck 28. A new workpiece W may then be inserted in the spindle number 12 and operation of the apparatus 10 reinitiated.

In summary, numerous benefits result from employing the concepts of the present invention. The apparatus 10 advantageously displays smooth, reliable operating characteristics. Together, the preload bearing system, shot pin 70 and locking pins 84 cooperate to allow more accurate and reproduceable machining operations to be completed on each workpiece W. The apparatus also includes a unique piston head assembly 120 that cooperates with a stop 140 to allow a selected incremental length of a workpiece to be advanced from a chuck of the rotary spindle member 12 for the completion of machining operations. Further, all actuators are pneumatically controlled by a microprocessor controller 160 through a valve bank 162 a-f for efficient, automated operation.

The foregoing description of the preferred embodiment of the invention has been presented for purposes of illustration and description. It is not intended to be exhaustive or to limit the invention to the precise form disclosed. Obvious modifications or variations are possible in light of the above teachings. For example, the drive transmission system may be modified. One such modification to allow indexing of the individual workpieces W in the spindle members 12 independent of the indexing of the spindle carriage 34 may be accomplished by removing the fixed gear 52 and keying the drive shaft 56 of the indexing apparatus 48 directly to the hub 58. Four other rotary indexing apparatus 48 are then operatively connected to each of the planetary gears 68. These four additional indexing apparatus 48 may be selectively controlled to independently index each of the individual spindle members 12/workpeices W for completion of various machining/processing steps as desired. Of course, if desired, other drive motors including stepping motors may be utilized depending on the particular application of the present apparatus 10.

The preferred embodiment was chosen and described to provide the best illustration of the principles of the invention and its practical application to thereby enable one of ordinary skill in the art to utilize the invention in various embodiments and with various modifications as are suited to the particular use contemplated. All such modifications and the variations are within the scope of the invention as determined by the appended claims when interpreted in accordance with the breadth to which they are fairly, legally and equitably entitled.

I claim:

1. A spindle apparatus for holding a workpiece, comprising:
    a support means;
    a rotary spindle member for holding a workpiece;
    means for orbitally mounting said rotary spindle member to said support means;
    means for rotatively driving said spindle member and said mounting means, said driving means including a rotary indexer and a transmission, said transmission including a stationary gear mounted in a fixed position, a planetary gear orbiting said stationary gear and a rotary spindle drive gear engaging said planetary gear;
    means for axially advancing an incremental length of said workpiece through said rotary spindle member for machining; and
    means for operatively controlling both said driving means and said advancing means.

2. The spindle apparatus set forth in claim 1, wherein said mounting means includes a headstock assembly and a tailstock assembly.

3. The spindle apparatus set forth in claim 2, wherein said rotary spindle member includes a chuck for gripping said workpiece, said chuck being mounted in said headstock assembly.

4. The spindle apparatus set forth in claim 3, further including means for locking said rotary spindle member in a selected position.

5. The spindle apparatus set forth in claim 4, wherein said locking means include a locking pin and means for selectively moving said locking pin between a first position wherein said pin is received in an aperture in said rotary spindle member so as to lock the spindle member in position and a second position wherein said locking pin is withdrawn from said aperture.

6. The spindle apparatus set forth in claim 4, further including means for fixing said mounting means in a selected position.

7. The spindle apparatus set forth in claim 6, wherein said fixing means includes a shot pin and means for selectively displacing said shot pin between a first position wherein said shot pin engages an aperture in said head stock assembly so as to lock said mounting means in position and a second position wherein said shot pin is withdrawn from said aperture.

8. The spindle apparatus set forth in claim 7, wherein said driving means includes a rotary indexer connected to a transmission.

9. The spindle apparatus set forth in claim 8, wherein said stationary gear, planetary gear and rotary spindle drive gear are of the same ratio.

10. The spindle apparatus set forth in claim 9, wherein said advancing means comprises a piston assembly received in said rotary spindle member.

11. The spindle apparatus set forth in claim 10, wherein said piston assembly includes a piston head having a cavity, a captive pin received in sliding engagement in said cavity and port means in said piston head for feeding pressurized fluid to said captive pin.

12. The spindle apparatus set forth in claim 11, wherein said piston head includes a socket for engaging a distal end of said workpiece.

13. The spindle apparatus set forth in claim 12, wherein said control means includes first, second and third actuators for said rotary spindle member locking means, said mounting member fixing means and said workpiece advancing means respectively, and a pressurized fluid source for operating said actuators.

14. The spindle apparatus set forth in claim 13, wherein said control means further includes a microprocessor controller and valve and feed means for directing pressurized fluid between said pressurized fluid source and said first, second and third actuators.

15. The spindle apparatus set forth in claim 14, further including bearings for supporting said orbital mounting means and means for pre-loading the bearings prior to machining said workpiece.

16. The spindle apparatus set forth in claim 15, wherein said pre-loading means includes a pressurized fluid source, control valve means and means for directing pressurized fluid to a sealed space between said orbital mounting means and said support means so as to pre-load said bearings.

17. The spindle apparatus set forth in claim 1, wherein said advancing means comprises a piston assembly received in said rotary spindle member.

18. The spindle apparatus set forth in claim 17, wherein said piston assembly includes a piston head having a cavity, a captive pin received in sliding engagement in said cavity and port means in said piston head for feeding pressurized fluid to said captive pin.

19. The spindle apparatus set forth in claim 18, wherein said piston head includes a socket for engaging a distal end of said workpiece.

20. The spindle apparatus set forth in claim 19, wherein said control means includes first, second and third actuators for said rotary spindle member locking means, said mounting member fixing means and said workpiece advancing means respectively, and a pressurized fluid source for operating said actuators.

21. The spindle apparatus set forth in claim 20, wherein said control means further includes a microprocessor controller and valve and feed means for directing pressurized fluid between said pressurized fluid source and said actuators.

22. The spindle apparatus set forth in claim 1, further including bearings for supporting said orbital mounting means and means for pre-loading the bearings prior to machining said workpiece.

23. The spindle apparatus set forth in claim 22, wherein said pre-loading means includes a pressurized fluid source, control valve means and means for directing pressurized fluid to a sealed space between said orbital mounting means and said support means so as to pre-load said bearings.

* * * * *